US007814938B2

(12) United States Patent
Davis, Jr. et al.

(10) Patent No.: US 7,814,938 B2
(45) Date of Patent: Oct. 19, 2010

(54) SAFETY LINE HOSE

(76) Inventors: Willie M. Davis, Jr., 3805 Jasper Rd., Springfield, OR (US) 97477; Geneva M. Franks, 2755 Taito St., Eugene, OR (US) 97404; Scotty R. Randall, 4981 Parsons Ave., Eugene, OR (US) 97402

( * ) Notice: Subject to any disclaimer, the term of this patent is extended or adjusted under 35 U.S.C. 154(b) by 125 days.

(21) Appl. No.: 11/801,783

(22) Filed: May 11, 2007

(65) Prior Publication Data

US 2008/0277014 A1 Nov. 13, 2008

(51) Int. Cl.
*F16L 3/00* (2006.01)
*H01B 7/00* (2006.01)

(52) U.S. Cl. ....................... 138/106; 138/117; 138/110; 174/47; 174/115

(58) Field of Classification Search ................. 138/130, 138/107, 109, 110; 248/925; 174/47, 115
See application file for complete search history.

(56) References Cited

U.S. PATENT DOCUMENTS

| | | | | | |
|---|---|---|---|---|---|
| 2,670,762 | A | * | 3/1954 | Stivason et al. | 138/107 |
| 2,776,385 | A | * | 1/1957 | Modrey | 310/71 |
| 3,211,473 | A | * | 10/1965 | Schmid | 285/114 |
| 3,374,013 | A | * | 3/1968 | Clay et al. | 285/114 |
| 3,431,947 | A | * | 3/1969 | Hines | 138/106 |
| 3,794,079 | A | * | 2/1974 | Fishel | 138/103 |
| 4,249,713 | A | | 2/1981 | Glynn et al. | |
| 4,470,433 | A | * | 9/1984 | Vipond et al. | 138/106 |
| 5,073,682 | A | * | 12/1991 | Walling et al. | 174/70 A |
| 5,226,456 | A | * | 7/1993 | Semak | 138/107 |
| 5,513,826 | A | | 5/1996 | Lebaron | |

(Continued)

FOREIGN PATENT DOCUMENTS

| | | |
|---|---|---|
| JP | 59-158450 U | 10/1984 |

(Continued)

OTHER PUBLICATIONS

Korean Intellectual Property Office—ISA, International Search Report, International Application No. PCT/US2008/006052, Oct. 31, 2008, 2 pages.

(Continued)

*Primary Examiner*—James F Hook
(74) *Attorney, Agent, or Firm*—Joshua King; Graybeal Jackson LLP

(57) ABSTRACT

A safety line hose to which a worker can be attached and which includes a passageway for communicating an air compressor with a pneumatic tool. The safety line includes an elongated flexible pneumatic hose, an elongated flexible tubing enveloping the pneumatic hose, and an elongated, flexible, wear resistant sheath enveloping the tubing. A compressor air hose connector is attached to the end of the pneumatic hose located at the first end of the safety line hose, and is adapted to be connected to the outlet of an air compressor hose. A pneumatic tool connector is attached to the end of the pneumatic hose located adjacent the second end of the safety line hose, and is adapted to be connected to a pneumatic tool. A fastening member is attached to the first end of the safety line hose and is adapted to be releasably fastened to a safety line attachment member.

17 Claims, 2 Drawing Sheets

U.S. PATENT DOCUMENTS

| | | | | |
|---|---|---|---|---|
| 5,789,701 | A * | 8/1998 | Wettengel et al. | 174/41 |
| 5,901,756 | A * | 5/1999 | Goodrich | 138/167 |
| 5,933,914 | A * | 8/1999 | Beane | 15/339 |
| 6,308,741 | B1 * | 10/2001 | Payne | 138/110 |
| 6,712,181 | B2 * | 3/2004 | Nichols | 182/192 |
| 7,357,222 | B2 | 4/2008 | Durbic | |
| 2003/0159882 | A1 * | 8/2003 | Franckewich, Jr. | 182/82 |
| 2005/0189170 | A1 * | 9/2005 | Pyrzewski | 182/3 |
| 2006/0059858 | A1 | 3/2006 | Layman | |
| 2008/0000719 | A1 | 1/2008 | Jones | |
| 2008/0135119 | A1 * | 6/2008 | Tonooka et al. | 138/110 |
| 2008/0283137 | A1 * | 11/2008 | Davis et al. | 138/103 |

FOREIGN PATENT DOCUMENTS

| | | | |
|---|---|---|---|
| JP | 62114949 | U | 7/1987 |
| KR | 200246871 | Y1 | 9/2001 |
| KR | 200331481 | Y1 | 10/2003 |

OTHER PUBLICATIONS

Korean Intellectual Property Office—ISA, Written Opinion, International Application No. PCT/US2008/006052, Oct. 31, 2008, 6 pages.

J. Nigel Ellis, Introduction to Fall Protection, Amer. Society of Safety Engineers, Mar. 2001, pp. 169 and 362.

G. Budworth, The Complete Book of Knots, The Lyons Press, Octopus Publishing Group Ltd 1997, ISBN 1-55821-632-4.

S. Nichols, Fall Arrestor ® Personal Lifeline/Rope Grab System—Instruction /Specification Manual, version Mar. 2001 revision, published by Super Anchor Safety, reproduced on pp. 16-21 of the Total Package® Component Compatible Fall Protection System by Super Anchor Safety, 2006.

* cited by examiner

SAFETY LINE HOSE

BACKGROUND OF THE INVENTION

This invention relates to a safety line hose for use by workers requiring a safety line and whose job requires the use of pneumatic tools.

Workers such as roofers work at heights where a fall could cause serious injury or death. Occupational safety rules often require that such workers wear safety belts or harnesses which are attached to a safety line. The safety line can be secured to a member attached to the roof, such as the attachment member described in U.S. Pat. No. 4,249,713.

Roofers typically use a pneumatic nail or staple gun to secure roofing material to the structure. The use of a pneumatic gun requires the use of a pneumatic air hose extending from a compressor on the ground to the gun. The presence of both a safety line and a pneumatic air hose can lead to entanglement. If the pneumatic gun is dropped it can slide off the roof onto the ground.

SUMMARY OF THE INVENTION

The present invention is a safety line hose to which a worker can be attached and which includes a passageway for communicating compressed air with a pneumatic tool.

The safety line has a first and second end, and includes an elongated flexible pneumatic hose, an elongated flexible tubing enveloping the pneumatic hose, and an elongated, flexible, wear resistant sheath enveloping the tubing.

A compressor air hose connector is attached to the end of the pneumatic hose located at the first end of the safety line hose, and is adapted to be connected to an air hose from an air compressor.

A fastening member is attached to the first end of the safety line hose and is adapted to be releasably fastened to a safety line attachment member.

A pneumatic tool connector is attached to the end of the pneumatic hose located adjacent the second end of the safety line hose, and is adapted to be connected to a pneumatic tool.

DESCRIPTION OF PREFERRED EMBODIMENTS

Figure 1:
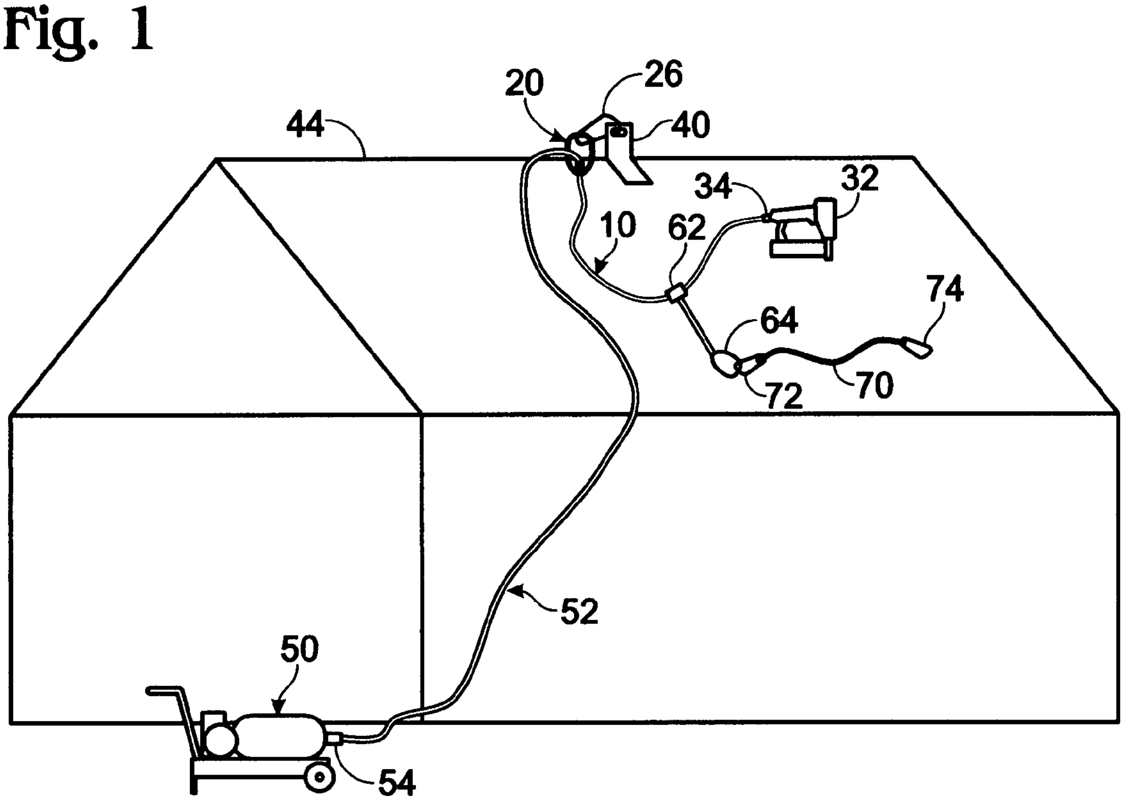
FIG. 1 is a perspective view of a structure having a roof upon which the safety line hose of the present invention is being used.

The safety line hose 10 of the present invention includes an inner flexible pneumatic hose 12 surrounded by a flexible tubing 14, such as nylon.

Flexible tubing 14 is surrounded by a wear resistant sheath 16, such as braided nylon. The outer surface of wear resistant sheath 16 must have frictional properties that allows a Prusik knot to cinch and hold.

Pneumatic hose 12 is a conventional pneumatic hose which has strength properties that are equal to or exceed strength properties imposed upon pneumatic hoses used for pneumatic tools by occupational safety laws, such as OSHA.

The first, upper end of safety line hose 10 is connected to a ring structure 20 having openings 22, 22', preferably separated by a strengthening cross member 24.

The end of pneumatic hose 12 adjacent the first, upper end of safety line hose 10 has a pneumatic connector 30 attached thereto to allow pneumatic hose 12 to be connected to an air hose 52 attached to an air compressor 50 via connector 54. Connector 30 and connector air hose 52 are of the type commonly used in the pneumatic tool art. In a first embodiment, pneumatic connector 30 is located within opening 22' of ring structure 20.

Figure 2:
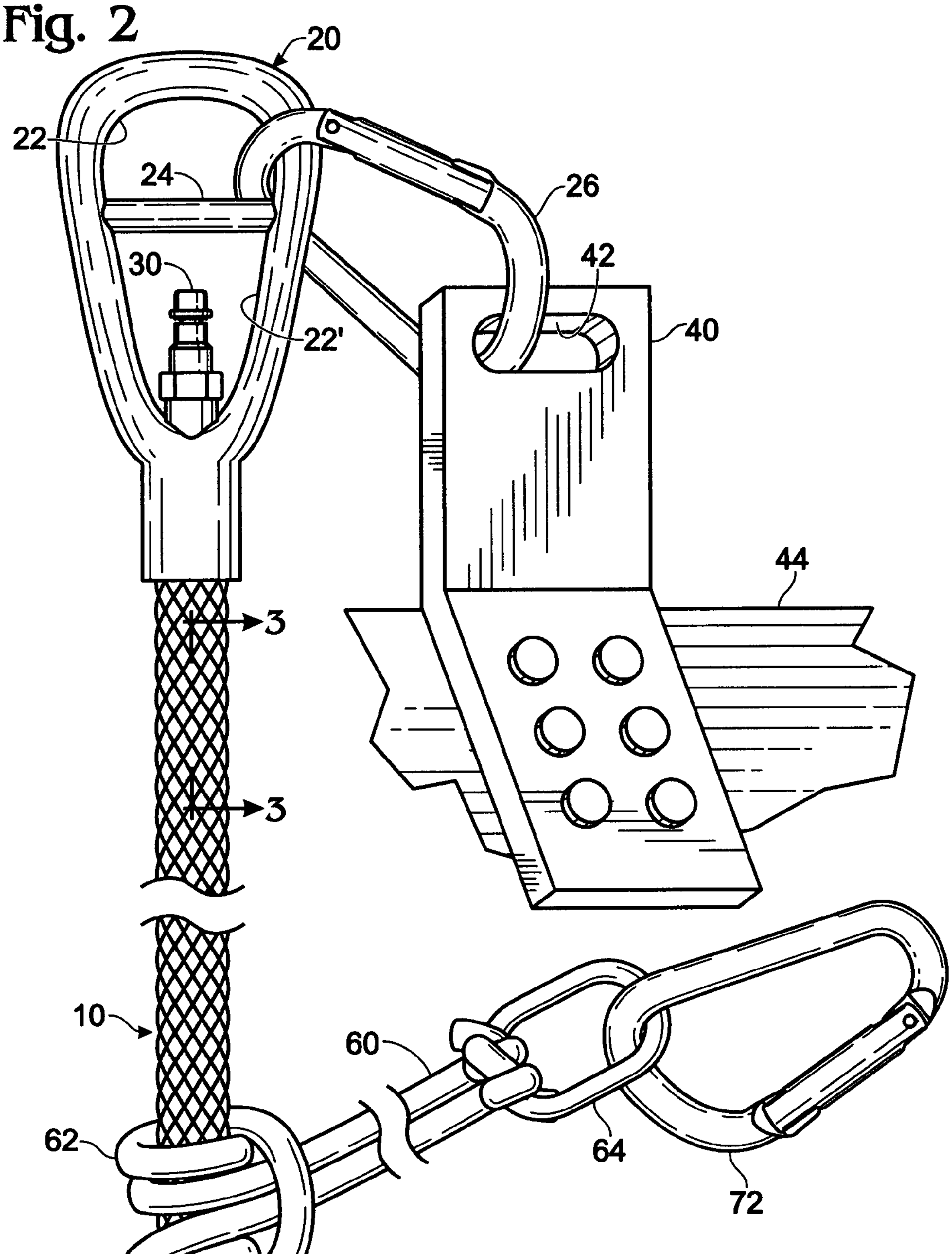
FIG. 2 is an enlarged perspective view of the upper end of a first embodiment of the safety line hose.

As best seen in FIG. 2, safety line hose 10 is attached to roof attachment member 40 by a karabiner 26, or other releasable fastening member, which passes through opening 22 in ring structure 20 and through opening 42 in roof attachment member 40. Roof attachment member 40 is removably attached to roof 44 by nails or screws. Alternatively, ring structure 20 can itself have a karabiner-type snap fastener construction that allows ring structure 20 to be directly attached to roof attachment member 40.

The lower end of pneumatic air hose 52 has a pneumatic connector 54 to allow pneumatic air hose 52 to be connected to a compressor 50 in a manner well known in the art The end of pneumatic hose 12 located adjacent the outer end of safety line hose 10 has a pneumatic connector 34 to allow connection to pneumatic tool 32. Pneumatic connector 34 is of the type well known in the art.

As best seen in FIG. 2, a Prusik cord 60 is formed into a Prusik knot 62 about safety line hose 10. A Prusik knot is a friction knot formed from a cord which can slide along a rope when no weight is applied, but which grips the rope when a pull is applied, such as that caused by a falling worker to whom the cord is attached. The outer end of cord 60 is attached to a loop member 64. A safety cord 70 has releasable fastening members 72 and 74 attached at the inner and outer ends thereof, respectively, as best seen in FIG. 1. Releasable fastening members 72 and 74 are preferably karabiners. Releasable fastening member 72 is attached to loop 64 of Prusik cord 60, and releasable fastening member 74 is attached to a safety harness or belt attached to a worker, not shown, in a manner well known in the art.

Figure 4:
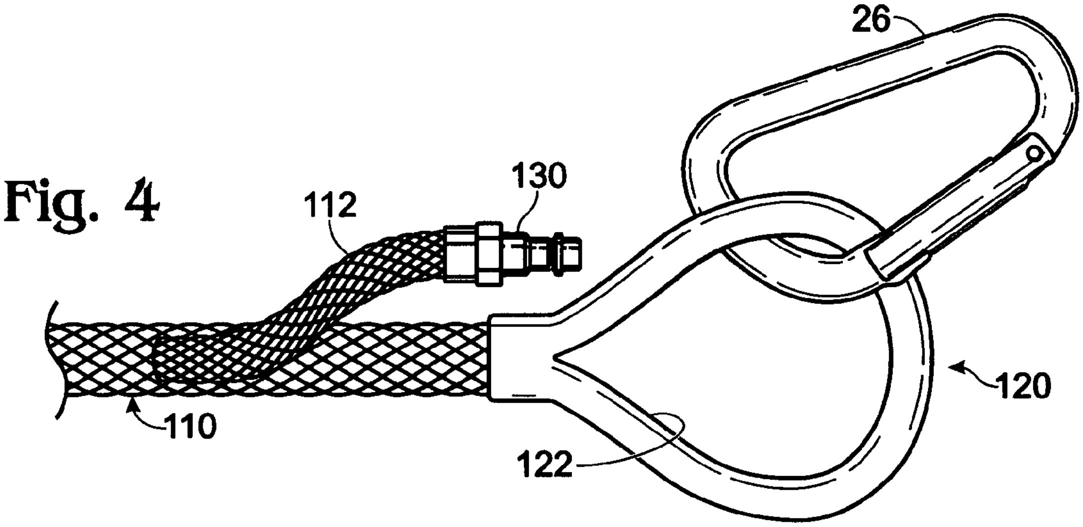
FIG. 4 is an enlarged perspective view of the upper end of a second embodiment of the safety line hose.
Figure 3:
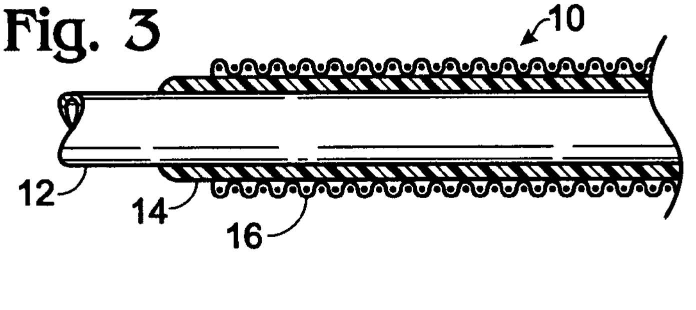
FIG. 3 is a cross-sectional view of the safety line hose.

The upper pneumatic hose attachment fixture 30 of safety line hose 10, which is attached to pneumatic hose 12, is shown as forming a part of ring structure 20 of safety line hose 10 in the first embodiment illustrated in FIGS. 1 and 2. Alternatively, the upper end of pneumatic hose 112 can exit safety line hose 110 prior to ring structure 120, as shown in the second embodiment illustrated in FIG. 4. In the second embodiment, the upper end of the pneumatic hose 112 has an upper attachment fixture 130 which can be connected to pneumatic air hose 52. Ring structure 120 is attached to the upper end of safety line hose 110 and has an opening 122 therein to which karabiner 26 or other releasable fastening member can be attached and used to fasten to roof attachment member 40 in the same manner as shown in FIG. 1. Alternatively, ring structure 120 can have a karabiner-type snap fastener construction that allows ring structure 120 to be directly attached to roof attachment member 40. The structure of safety line hose 110 is otherwise identical to that of safety line hose 10 shown in FIG. 3 with like parts having the same reference numbers but increased by 100.

The strength properties of safety line hose 10 are selected to equal or exceed those strength properties imposed upon roofer safety lines by occupational safety laws, such as OSHA.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A safety line hose having first and second ends comprising:
   - an elongated flexible pneumatic hose;
   - an elongated flexible tubing encircling and enveloping said pneumatic hose;
   - an elongated, flexible, wear resistant sheath encircling and enveloping said tubing and having strength properties adequate to safely secure a roofer during a fall from a roof;
   - a compressor air hose connector attached to the end of said pneumatic hose located at the first end of said safety line hose and adapted to be connected to the outlet end of an air compressor air hose;
   - a pneumatic tool connector attached to the end of said pneumatic hose located adjacent the second end of said safety line hose and adapted to be connected to a pneumatic tool; and
   - a fastening member attached to said first end of said safety line hose and adapted to be releasably fastened to a safety line attachment member,
   - wherein the safety line hose is circular in cross-section and is configured to permit continuously adjustable worker positioning along the safety line hose.

2. The safety line hose of claim 1 wherein said elongated flexible tubing is formed of nylon.

3. The safety line hose of claim 1 wherein said wear resistant sheath has an outer surface with frictional properties adapted to allow a Prusik knot to cinch and hold.

4. The safety line hose of claim 3 wherein said elongated, flexible, wear resistant sheath is formed of braided nylon.

5. The safety line hose of claim 1 wherein said fastening member is a ring.

6. The safety line hose of claim 5 wherein a releasable fastening member is attached to said ring.

7. The safety line hose of claim 6 wherein said releasable fastening member is a karabiner.

8. The safety line hose of claim 1 wherein said compressor air hose connector forms a part of said fastening member.

9. The safety line hose of claim 1 wherein said compressor air hose connector exits from said safety line hose prior to said safety fastening member.

10. A safety line hose having first and second ends comprising:
    - an elongated flexible pneumatic hose;
    - an elongated, flexible, wear resistant sheath encircling and enveloping said hose and having strength properties adequate to safely secure a roofer during a fall from a roof;
    - a compressor air hose connector attached to the end of said pneumatic hose located at the first end of said safety line hose and adapted to be connected to the outlet end of an air compressor air hose;
    - a pneumatic tool connector attached to the end of said pneumatic hose located adjacent the second end of said safety line hose and adapted to be connected to a pneumatic tool; and
    - a fastening member attached to said first end of said safety line hose and adapted to be releasably fastened to a safety line attachment member,
    - wherein the safety line hose is circular in cross-section and is configured to permit continuously adjustable worker positioning along the safety line hose.

11. The safety line hose of claim 10 wherein said wear resistant sheath has an outer surface with frictional properties adapted to allow a Prusik knot to cinch and hold.

12. The safety line hose of claim 11 wherein said elongated, flexible, wear resistant sheath is formed of braided nylon.

13. The safety line hose of claim 10 wherein said fastening member is a ring.

14. The safety line hose of claim 13 wherein a releasable fastening member is attached to said ring.

15. The safety line hose of claim 14 wherein said releasable fastening member is a karabiner.

16. The safety line hose of claim 10 wherein said compressor air hose connector forms a part of said fastening member.

17. The safety line hose of claim 10 wherein said compressor air hose connector exits from said safety line hose prior to said safety fastening member.

* * * * *